United States Patent
Youm

(10) Patent No.: US 6,879,123 B2
(45) Date of Patent: Apr. 12, 2005

(54) DEVICE TO CONTROL A 3-PHASE MOTOR

(75) Inventor: Jang-hyoun Youm, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/751,915

(22) Filed: Jan. 7, 2004

(65) Prior Publication Data

US 2005/0007048 A1 Jan. 13, 2005

(30) Foreign Application Priority Data

Jul. 8, 2003 (KR) .............................. 10-2003-0046208

(51) Int. Cl.[7] .............................................. H02P 3/14
(52) U.S. Cl. ...................... 318/370; 318/269; 318/273; 318/377; 318/375; 318/757; 363/37; 323/351
(58) Field of Search ......................... 318/41, 360–377, 318/757–759, 801–805; 363/37; 323/351

(56) References Cited

U.S. PATENT DOCUMENTS

| | | | | |
|---|---|---|---|---|
| 4,627,370 A | * | 12/1986 | Nakamura ................... | 112/275 |
| 5,049,793 A | * | 9/1991 | Tanaka et al. ............... | 318/436 |
| 5,892,341 A | * | 4/1999 | Chmiel ........................ | 318/362 |
| 6,232,758 B1 | * | 5/2001 | Konda et al. ................ | 323/351 |
| 2004/0119432 A1 | * | 6/2004 | Youm .......................... | 318/375 |
| 2004/0155615 A1 | * | 8/2004 | Youm .......................... | 318/377 |
| 2004/0155623 A1 | * | 8/2004 | Youm .......................... | 318/801 |
| 2004/0160792 A1 | * | 8/2004 | Youm et al. .................. | 363/37 |
| 2004/0232871 A1 | * | 11/2004 | Deck et al. ................. | 318/652 |

* cited by examiner

*Primary Examiner*—Paul Ip
(74) *Attorney, Agent, or Firm*—Staas & Halsey LLP

(57) ABSTRACT

A device to control a 3-phase motor having an inverter connected to each phase terminal and a brake to arrest the 3-phase motor, includes a power supply to supply power to the brake and the inverter at the same time based on a predetermined synchronization signal. The device also includes a control unit to output an inverter control signal to control the inverter and a power control signal to enable the power supply to supply the power to the brake and the inverter. Thus, the device to control a 3-phase motor has an immediate response to a control signal with a reduced production cost and a system size, by reducing circuit components such as a brake relay and a brake power supply.

11 Claims, 6 Drawing Sheets

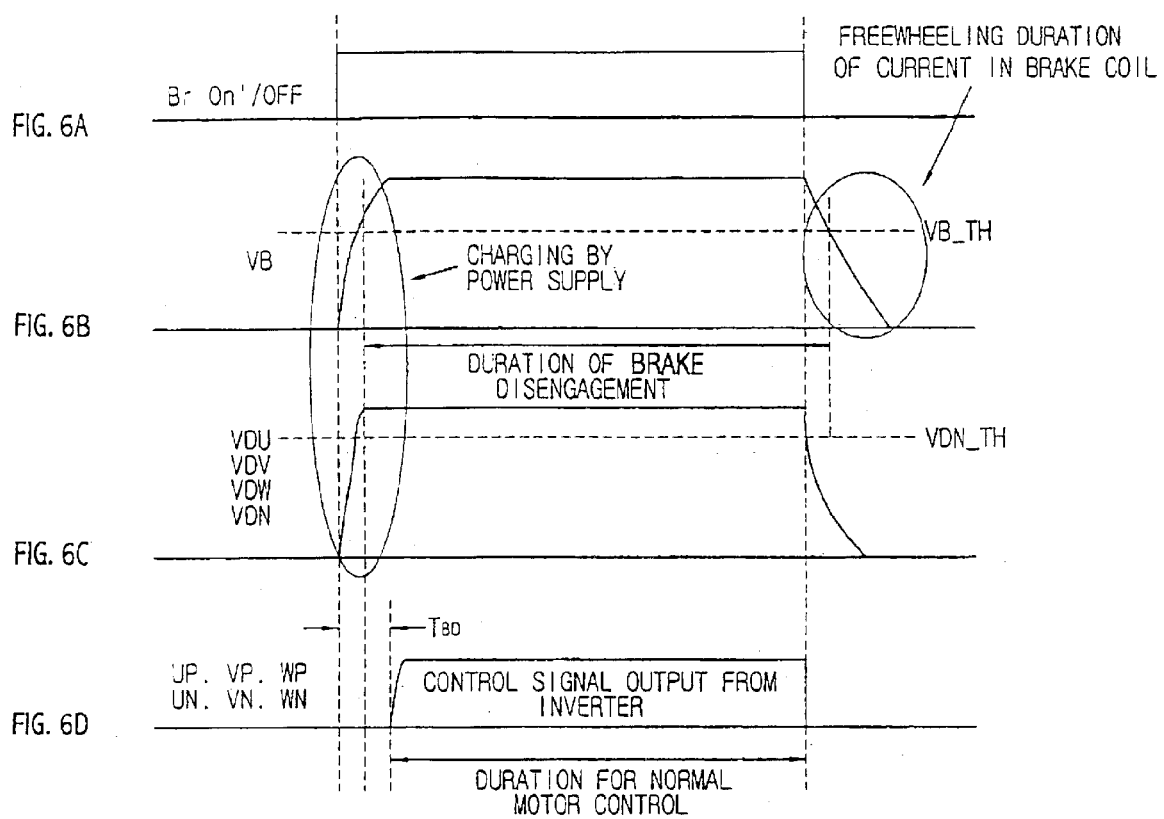

DEVICE TO CONTROL A 3-PHASE MOTOR

CROSS-REFERENCE TO RELATED APPLICATIONS

This application claims the benefit of Korean Patent Application No. 2003-46208, filed Jul. 8, 2003, in the Korean Intellectual Property Office, the disclosure of which is incorporated herein by reference.

BACKGROUND OF THE INVENTION

1. Field of the Invention

The present invention relates to a device to control a 3-phase motor, and more particularly, to a device to control a 3-phase motor having an inverter and a brake.

2. Description of the Related Art

Recently, a lot of household appliances such as an air conditioner, a washing machine, and a refrigerator use a 3-phase motor controlled by an inverter to increase energy efficiency. A servo motor system designed for the household appliances generally adopts a brake integrated with a motor as an arresting gear. The brake integrated with the motor is powered by an additional power supply to be electrically insulated from a system, and is generally controlled by a relay.

FIG. 1 is a circuit diagram of a conventional device to control a 3-phase motor. As illustrated in FIG. 1, the device to control the 3-phase motor includes a 3-phase motor 100, an inverter 110, a brake power supply 120, a power supply 130, and a microcomputer 140.

A brake 101 to arrest the motor 100 and a brake coil 102 are integrated into the 3-phase motor 100. The brake 101 keeps arresting the 3-phase motor 100 as long as current is not applied to the brake coil 102. Meanwhile, the brake 101 stops arresting the 3-phase motor 100 if the current is applied to the brake coil 102.

The inverter 110 includes six transistors to switch, and a transistor operation circuit 111. The transistors are divided into three first switches Q1 through Q3 connected between respective phase terminals of the 3-phase motor 100 and a positive terminal "P" of a DC (direct current) power supply, and three second switches Q4 through Q6 connected between the respective phase terminals of the 3-phase motor 100 and a negative terminal "N" of the DC power supply. Also, each transistor is connected to a freewheeling diode Df1 in parallel.

The transistor operation circuit 111 including a gate-drive IC 112 is connected to a gate terminal of the transistor, and controls switching of the transistors. The gate-drive IC 112 is supplied with predetermined input powers Vdu, Vdv, Vdw, Vdn (or will be indicated as an inverter power) and biases the gate terminal according to an applied control signal.

The brake power supply 120 includes a switching-mode power supply (SMPS) control IC 121, a brake control relay 122, a photo coupler 123, diodes Db, Df, and a capacitor Cb. The SMPS control IC 121 in the brake power supply 120 supplies predetermined brake power to the brake coil 102 integrated with the servo motor. The brake control relay 122 switches the power supplied to the servo motor from the SMPS control IC 121 according to an external control signal. The diode Df is a freewheeling diode, and the other diode Db is used to prevent the current from flowing in a reverse direction. The photo coupler 123 is a combination of a light-emitting diode LED1 and a transistor Q7 electrically insulated from each other. As the current is applied to the LED1, the photo coupler 123 emits light and gets switched on by biasing of a base terminal of the transistor Q7.

In the brake power supply 120, if the SMPS control IC 121 outputs voltage, the capacitor Cb gets charged and the photo coupler 123 is applied with the current, which switches the brake control relay 122 on. Accordingly, the brake coil 102 is supplied with the power.

The power supply 130 includes a SMPS control IC 131, a transformer 132, a diode Dr, and the capacitor C1. The SMPS control IC 131 applies predetermined voltage to a first induction coil 133 of the transformer 132. The transformer 132 induces less voltage than the voltage applied to the first induction coil 133 to opposite terminals of a second induction coil 134 having a relatively smaller winding ratio.

The voltage applied to the second induction coil 134 is charged in a capacitor C1 via the diode Dr to prevent a counter-current. Here, the voltage charged in the capacitor C1 is supplied to the gate-drive IC 112 as an input power.

The microcomputer 140 controls operation of the 3-phase motor 100 by outputting the control signal of the gate-drive IC 112 of the inverter 110, and controls operation of the brake 101 by outputting a predetermined brake control signal to the photo coupler 123 in the brake power supply 120 and switching the LED1.

FIGS. 2A through 2C are graphs illustrating operation of a conventional circuit to control the 3-phase motor based on time. As shown in FIG. 1 and FIGS. 2A through 2C, the 3-phase motor 100 is generally arrested by the brake 101 when the power is off, or when the brake control signal is 0, e.g., 0V. In other words, if the brake control signal is 0, the brake control relay 122 is in an open state. Meanwhile, if the brake control signal is 1, the brake control relay 122 is in a closed state, loosing the brake 101. Accordingly, as illustrated in FIG. 2A and FIG. 2B, if the brake control signal is 0, the voltage between opposite terminals of the freewheeling diode Df1 (will be referred as brake voltage Vb) becomes 0. Also, the brake voltage Vb increases to a predetermined voltage when the brake control signal is 1.

FIG. 2B shows that the brake voltage Vb has a time-delay to be stabilized and loosen the brake 101, even after the brake control signal becomes 1. The time-delay is divided into a time-delay tr that it takes for the brake control relay 122 to begin operation by an operation coil, and a time-delay tb due to a bounce time decided by a specification of the brake control relay 122.

A conventional motor cannot be controlled with the brake 101 on. An axis of the 3-phase motor 100 will be distorted by force of the brake 101 holding the axis of the 3-phase motor 100, and by torque of the 3-phase motor controlled by the inverter 110. If the distortion becomes serious, the brake 101, the axis of the 3-phase motor 100, and the inverter 110 may be damaged. Hence, the output signal from the inverter 110 should be applied to each phase of the 3-phase motor 100 after the brake 101 is completely disengaged, and the brake 101 should start to operate after the output signal from the inverter 110 completely disappears. A relationship between the above-described mechanism and time is illustrated in FIG. 2B and FIG. 2C.

The conventional device to control the 3-phase motor 100 is using the brake power supply 120 additionally, other than a power supply for operation of the inverter (input power of the gate-drive IC 112) as well as using the brake control relay 122. In the relay 122, as an arresting capacity of the brake increases, the current required to control it increases. Accordingly, a size of the relay 122 and the brake coil 102 have to be increased, which has a disadvantage of complicating the circuit to control the 3-phase motor and increasing production cost.

Also, the conventional device to control the 3-phase motor 100 has low energy efficiency because the brake and the inverter keep consuming power even while the 3-phase motor 100 is arrested by the brake 101. The relay 122 causes a time-delay in operation of the 3-phase motor 100 responding to the brake control signal and the inverter control signal.

SUMMARY OF THE INVENTION

Accordingly, it is an aspect of the present invention to provide a device to control a 3-phase motor having an immediate response to a control signal and with a reduced production cost and a system size, by reducing circuit components such as a brake relay and a brake power supply.

Additional aspects and/or advantages of the invention will be set forth in part in the description which follows and, in part, will be obvious from the description, or may be learned by practice of the invention.

The foregoing and/or other aspects of the present invention are achieved by providing a device to control a 3-phase motor having an inverter connected to each phase terminal and a brake to arrest the 3-phase motor. The device includes a power supply to supply power to the brake and the inverter at the same time based on a predetermined synchronization signal, and a control unit to output an inverter control signal to control the inverter and a power control signal to enable the power supply to supply the power to the brake and the inverter.

According to an aspect of the invention, the power supply includes a brake power supply to supply the power to the brake and an inverter power supply to supply the power to the inverter, wherein the brake power supply and the inverter power supply are triggered by the synchronization signal to supply the power.

According to an aspect of the invention, the power control signal transferred from the control unit to the power supply is the synchronization signal triggering the brake power supply and the inverter power supply.

BRIEF DESCRIPTION OF THE DRAWINGS

The above and/or other aspects and advantages of the present invention will become apparent and more readily appreciated from the following description of the embodiments, taken in conjunction with the accompany drawings of which:

FIG. 6A is a graph illustrating a waveform diagram of a brake on/off signal transferred to a power supply from a control unit of the circuit to control the 3-phase motor, according to an embodiment of the present invention based on time;

FIG. 6B is a waveform diagram of a brake power supply according to the brake control signal;

FIG. 6C is a waveform diagram of an inverter power supply according to the brake control signal;

FIG. 6D is a waveform diagram of an inverter output signal according to the brake control signal;

DETAILED DESCRIPTION OF THE PREFERRED EMBODIMENTS

Figure 1:
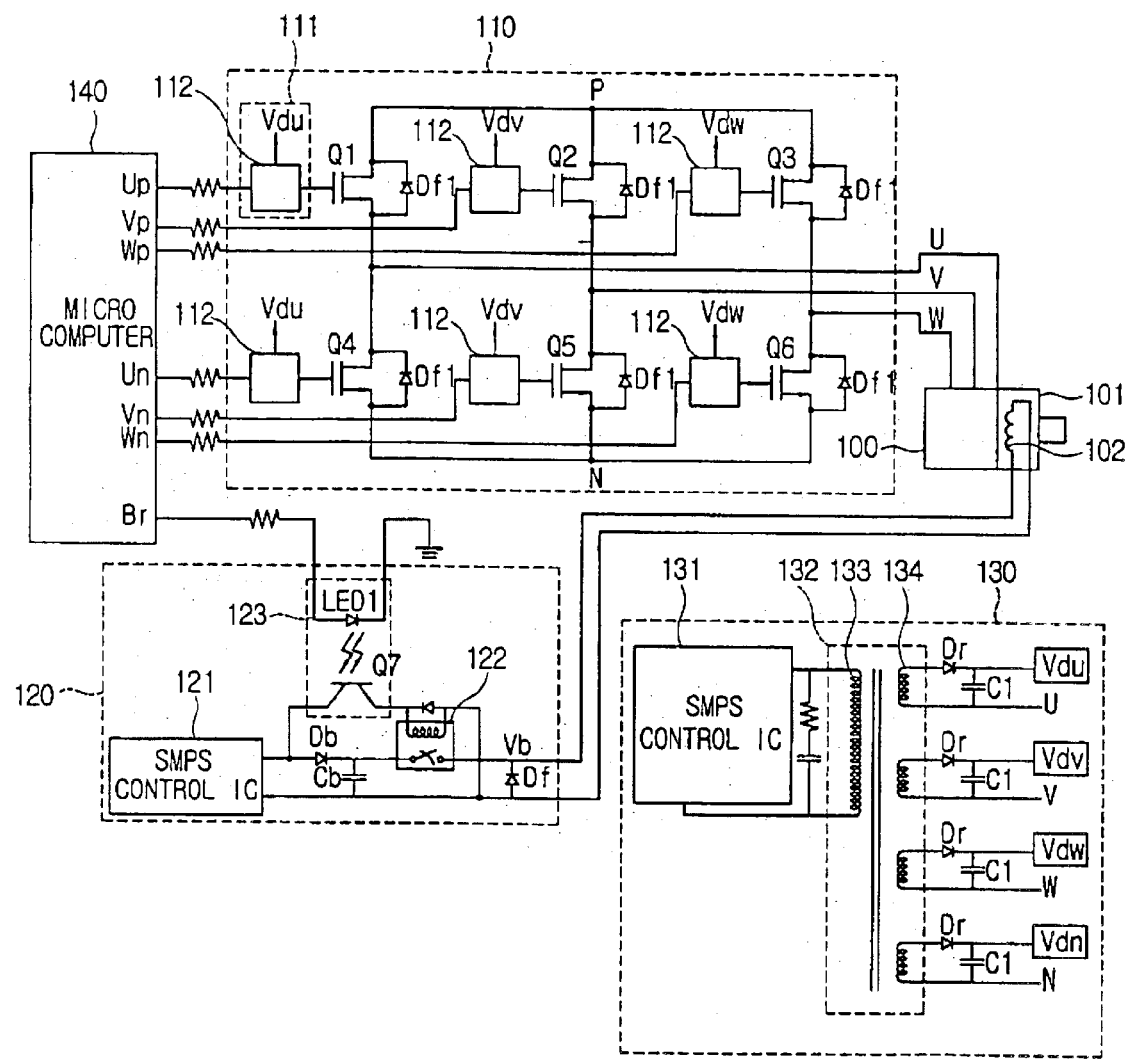
FIG. 1 is a circuit diagram of a conventional device to control a 3-phase motor.
Figure 2:
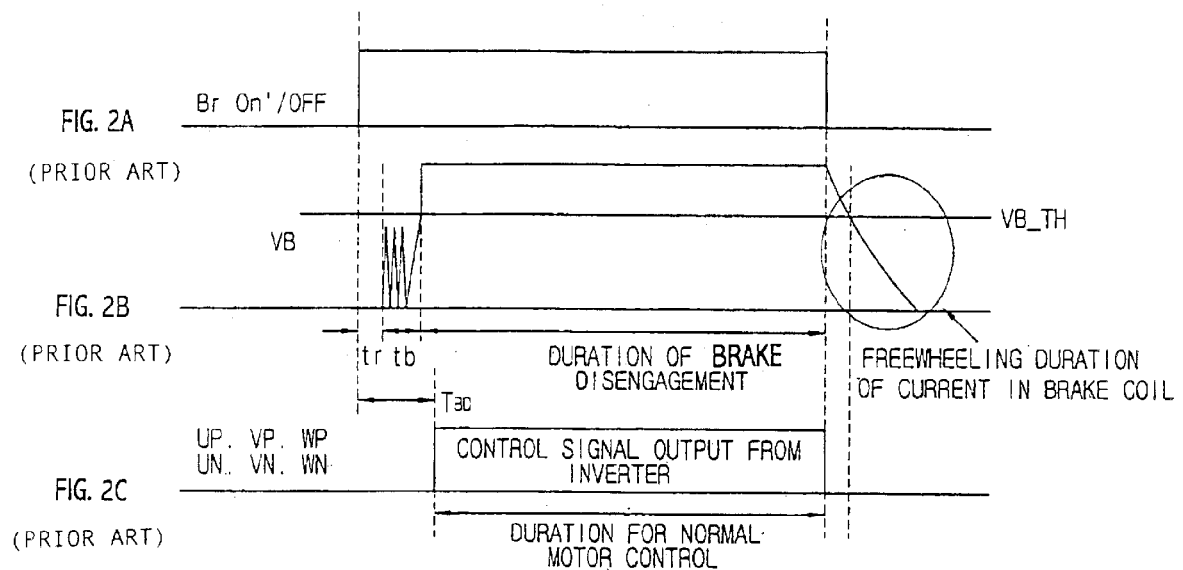
FIG. 2A is a graph illustrating a waveform diagram of a brake control signal of the conventional device to control the 3-phase motor shown in FIG. 1 based on time.
FIG. 2B is a waveform diagram of a brake power supply according to the brake control signal.
FIG. 2C is a waveform diagram of an inverter output signal according to the brake control signal.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 3:
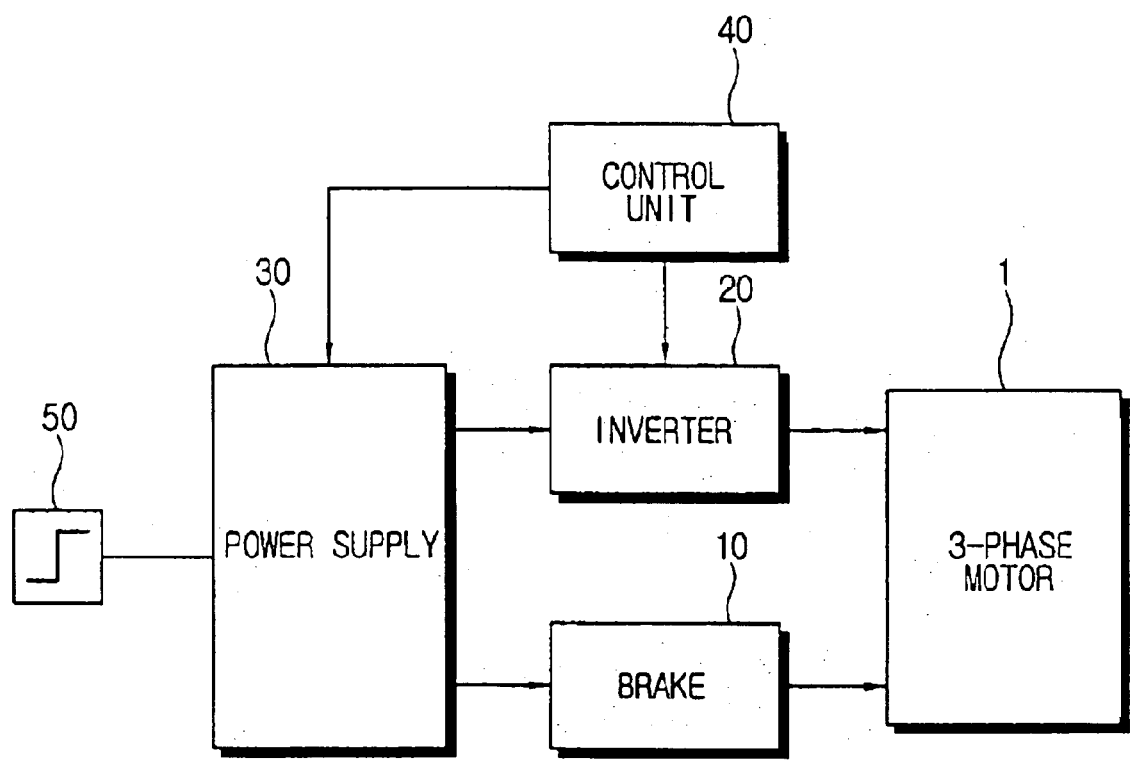
FIG. 3 is a block diagram of a device to control a 3-phase motor, according to an embodiment of the present invention.

FIG. 3 is a block diagram of a device to control a 3-phase motor, according to an embodiment of the present invention. As illustrated in FIG. 3, the device to control the 3-phase motor includes a 3-phase motor 1, a brake 10, an inverter 20, a power supply 30, and a control unit 40. The 3-phase motor 1 is arrested and operated by the brake 10 and the inverter 20, respectively.

The power supply 30 is triggered by a synchronizing signal 50 to supply power to the inverter 20 and the brake 10 at the same time. The control unit 40 outputs an inverter control signal required for operation of the 3-phase motor 1 to the inverter 20. Also, it outputs a power control signal to the power supply 30, which enables the power supply 30 to supply the power to the inverter 20 and the brake 10.

The brake 10 arrests the 3-phase motor 1 while it is not supplied with the power, and the brake 10 disengages as the power supply 30 supplies the brake 10 with the power. If the control unit 40 outputs the power control signal enabling the power supply 30 to supply the inverter 20 and the brake 10 with the power, the power supply 30 is triggered by the synchronizing signal 50 and supplies the inverter 20 and the brake 10 with the power at the same time. Accordingly, the inverter 20 supplied with the power operates the 3-phase motor 1 upon disengagement of the brake 10.

Figure 4:
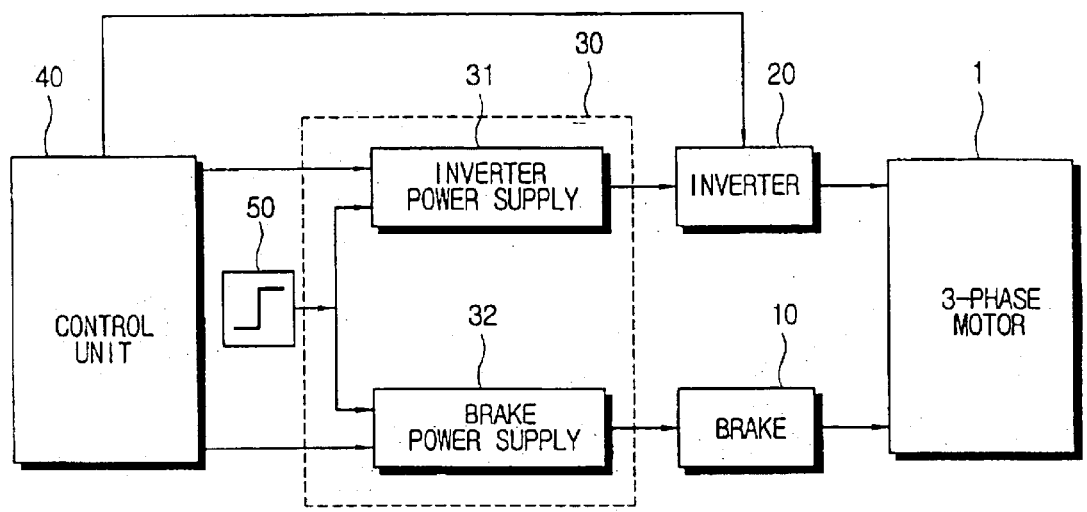
FIG. 4 is a block diagram of the device to control the 3-phase motor, according to another embodiment of the present invention.

FIG. 4 is a block diagram of the device to control the 3-phase motor, according to another embodiment of the present invention. Compared with the device to control the 3-phase motor in FIG. 3, the device to control the 3-phase motor illustrated in FIG. 4 is distinctive in that the power supply 30 is divided into an inverter power supply 31 and a brake power supply 32.

While the power supply 30 in FIG. 3 supplies the power to the inverter 20 and the brake 10 at the same time, the inverter 20 and the brake 10 according to the embodiment illustrated in FIG. 4, are operated by separate power supplies. However, both of the embodiments are configured to use the common synchronizing signal 50 for the inverter 20 and the brake 10 and to supply the power at the same time point. The control unit 40 applies the inverter control signal and the power control signal to the inverter power supply 31 and the brake power supply 32, respectively.

Figure 5:
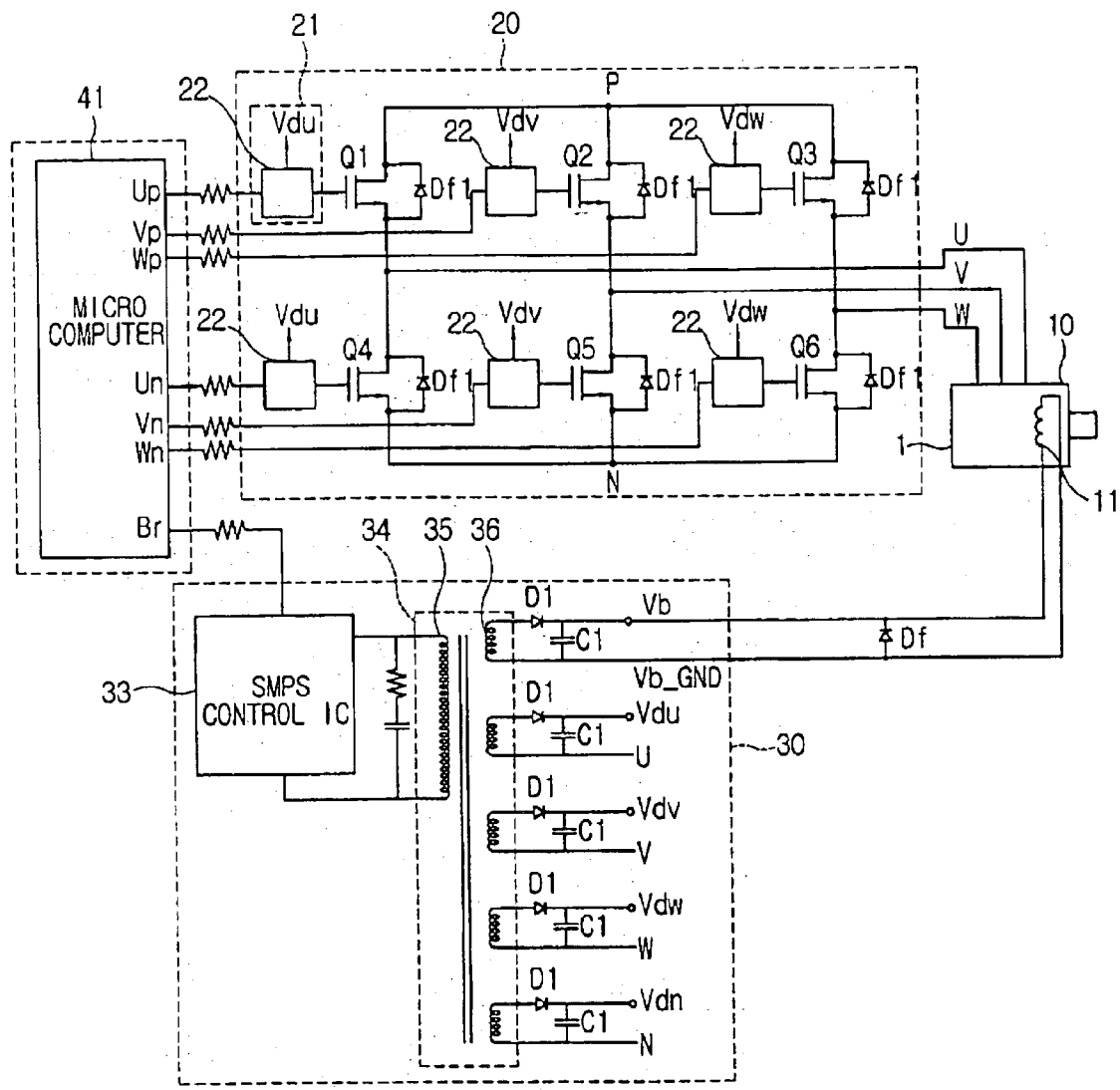
FIG. 5 is a block diagram of the device to control the 3-phase motor, according to another embodiment of the present invention.

FIG. 5 is a circuit diagram of the device to control the 3-phase motor, according to another embodiment of the present invention. As illustrated in FIG. 5, the device to control the 3-phase motor includes the 3-phase motor 1, the brake 10, the inverter 20, the power supply 30, and the control unit 40.

The 3-phase motor 1 having three phases of U, V, and W is integrated with the brake 10. The brake 10 disengages as a brake coil 11 is applied with current. The inverter 20 includes six transistors Q1 through 06 to switch, and an operation circuit 21 for the transistors.

The transistors are divided into three first switches Q1 through Q3 connected between respective phase terminals of the 3-phase motor 1 and a positive terminal "P" of a DC power supply, and three second switches Q4 through Q6 connected between the respective phase terminals of the 3-phase motor 1 and a negative terminal "N" of the DC power supply. Each transistor is connected to a freewheeling diode Df1 in parallel.

The operation circuit 21 for the transistors includes a gate-drive IC 22 and is connected to a gate terminal of each transistor to control switching of the transistor. The gate-drive IC 22 is supplied with a predetermined input power and biases the gate terminal of the transistor according to an inputted control signal.

The power supply 30 includes an SMPS control IC 33, a transformer 34, a diode D1, and a capacitor C1. The SMPS control IC 33 outputs a predetermined voltage to a first induction coil 35 of the transformer 34, and induces less voltage than the voltage applied to the first induction coil 35 to a second induction coil 36 having a relatively smaller winding ratio. The voltage induced on the second coil 36 of the transformer 34 is charged in the capacitor C1 to be used as the input power of the gate-drive IC 22 and to provide a brake power Vb to the brake 10.

The control unit 40 includes a microcomputer 41 which outputs an enable signal Br to enable the power supply 30 to output the power to the inverter 20 and the brake 10. Also, the microcomputer 41 outputs the control signal to the inverter 20 to operate the 3-phase motor 1.

Accordingly, as the power supply 30 receives the enable signal Br from the control unit 40, the power supply 30 outputs the brake power Vb and the inverter power Vd. Upon receiving the brake power Vb from the power supply 30, the brake 10 disengages. Also, the inverter 20 is supplied with the power to transmit the control signal to the 3-phase motor 1 for operation. The enable signal Br transferred to the power supply 30 is not only a signal used to stop arresting of the brake 1 and to operate the 3-phase motor, but also the synchronizing signal used by the power supply 30 to supply the power to the brake 10 and the inverter 20.

FIGS. 6A through 6D are graphs illustrating operation of the circuit to control the 3-phase motor, according to an embodiment of the present invention based on time. FIG. 6A is a waveform diagram of both an enable signal Br transferred to the power supply 30 from the control unit 40 and a brake on/off signal. The power supply 30 supplies the brake power Vb and the inverter power Vd upon receiving the brake off signal. FIG. 6B and FIG. 6C illustrates waveforms of the brake power Vb and the inverter power Vd increasing steadily according to the brake off signal, respectively. According to FIG. 6D, if the brake power Vb reaches a predetermined criterion value (VB_TH), the control signal is transferred to each phase terminal of the 3-phase motor 1 from the inverter 20. Herein, this process has a time-delay according to a fan-out time of each element and an Integrated Circuit (IC) of the inverter 20.

FIG. 6A illustrates that the brake power Vb becomes 0V when the power supply 30 receives the brake on signal. As illustrated in FIG. 6B, the brake power Vb decreases steadily as current in the brake coil 11 is consumed by freewheeling of the freewheeling diode Db. Also, FIG. 6C illustrates that the inverter power Vd supplied to the inverter 20 decreases steadily by the capacitor C1. However, as shown in FIG. 6D, when the brake on signal is applied, the inverter stops outputting any signal from the point the inverter power Vd decreases below a criterion voltage.

According to the above, the present invention may increase a response speed of the 3-phase motor to the control signal, and decrease a production cost and a size of the product by not using a relay, or an additional brake power supply. Accordingly, the present invention may increase efficiency of the system by reducing power loss.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A device to control a 3-phase motor having an inverter connected to each phase terminal and a brake to arrest the 3-phase motor, comprising:

a power supply to supply power to the brake and the inverter at the same time based on a predetermined synchronization signal; and a control unit to output an inverter control signal to control the inverter and a power control signal to enable the power supply to supply the power to the brake and the inverter.

2. The device to control the 3-phase motor according to claim 1, wherein the power supply comprises:

a brake power supply to supply the power to the brake; and an inverter power supply to supply the power to the inverter, wherein the brake power supply and the inverter power supply are triggered by the synchronization signal to supply the power.

3. The device to control the 3-phase motor according to claim 2, wherein the power control signal, which is transferred from the control unit to the power supply, is the synchronization signal to trigger the brake power supply and the inverter power supply.

4. An apparatus to control a 3-phase motor having an inverter connected to a plurality of phase terminals and a brake to arrest the 3-phase motor, comprising:

a brake power supply to supply the power to the brake;

an inverter power supply to supply the power to the inverter; and a control unit to output an inverter control signal to control the inverter and a power control signal to enable the power supply to supply the power to the brake and the inverter, wherein the brake power supply and the inverter power supply are triggered by a predetermined synchronization signal to supply the power to the brake and the inverter at the same time.

5. The apparatus according to claim 4, wherein the power control signal, which is transferred from the control unit to the power supply, is the synchronization signal to trigger the brake power supply and the inverter power supply.

6. An apparatus to control a 3-phase motor, comprising:

an inverter connected to a plurality of phase terminals;

a brake to arrest the 3-phase motor;

a power supply to supply power to the brake and the inverter at the same time based on a predetermined synchronization signal; and a control unit to output an inverter control signal to control the inverter and a power control signal to enable the power supply to supply the power to the brake and the inverter, wherein the inverter includes at least six transistors to switch, and an operation circuit to control the transistors.

7. The apparatus according to claim 6, wherein the transistors are divided into three first switches connected between respective phase terminals of the 3-phase motor and a positive terminal of a DC power supply, and three second switches connected between the respective phase terminal of the 3-phase motor and a negative terminal of the DC power supply.

8. The apparatus according to claim 7, wherein each of the transistors are connected in parallel to a freewheeling diode.

9. The apparatus according to claim 6, wherein the operation circuit for the transistors include a gate-drive integrated circuit, and is connected to a gate terminal of each transistor to control switching of the transistor, the gate-drive integrated circuit being supplied with a predetermined input power and biases the gate terminal of the respective transistor according to an inputted control signal.

10. The apparatus according to claim 9, wherein the power supply comprises an SMPS control integrated circuit, a transformer, a diode and a capacitor, wherein the SMPS control integrated circuit outputs a predetermined voltage to a first induction coil of the transformer, and induces less voltage than the voltage applied to the first induction coil to a second induction coil of the transformer having a smaller winding ratio.

11. The apparatus according to claim 10, wherein the voltage induced on the second coil of the transformer is charged in the capacitor to be used as the input power of the gate-drive integrated circuit and to provide a brake power to the brake.

* * * * *